United States Patent [19]
Tigner

[11] Patent Number: 5,957,237
[45] Date of Patent: Sep. 28, 1999

[54] MOTORIZED COLLAPSIBLE STEP

[75] Inventor: Robert H. Tigner, Arlington, Tex.

[73] Assignee: Specific Cruise Systems, Inc., Fort Worth, Tex.

[21] Appl. No.: 08/987,563

[22] Filed: Dec. 11, 1997

[51] Int. Cl.$^6$ ..................................................... E06C 5/16
[52] U.S. Cl. .............................. 182/127; 182/88; 182/91; 280/166
[58] Field of Search ................................... 280/163, 166; 296/62; 182/88, 96, 127, 166, 91; 105/444, 447

[56] References Cited

U.S. PATENT DOCUMENTS

| | | | |
|---|---|---|---|
| 3,957,284 | 5/1976 | Wright | 280/166 |
| 4,073,502 | 2/1978 | Frank | 280/166 |
| 4,106,790 | 8/1978 | Weiler | 280/166 |
| 4,110,673 | 8/1978 | Nagy | 318/466 |
| 5,505,476 | 4/1996 | Maccabee | 280/166 |

OTHER PUBLICATIONS

Owner's Manual #874 for Electric Steps Kwikee Products Company, Inc., Mar. 1996.

*Primary Examiner*—J. J. Swann
*Assistant Examiner*—Andrew J. Ririe
*Attorney, Agent, or Firm*—James E. Bradley

[57] ABSTRACT

A collapsible step assembly has upper and lower steps, and a housing which mounts below the door of a vehicle. The steps and housing are interconnected by pivotally mounted linkages. A pivot rod extends transversely through the housing with a linkage fastened to each end. A link arm is connected to the rod with a universal ball joint. The link arm is swively mounted to a drive gear with teeth which extend circumferentially along an arcuate edge portion. The drive gear is pivotally mounted to the housing and engages a drive gear extending from a motor. The drive gear rotates the pivot rod and, hence, the steps between retracted and extended positions. A flat outer edge of the drive gear abuts a mechanical stop in the extended position. When the user steps on the steps while they are extended, the stop will resist countertorque on the pivot rod from being applied through the gears to the motor. The geometry of the drivetrain causes the pivot point of the link arm to move past a central position to an overcenter position. In the overcenter position, a force on the link arm would tend to cause the drive gear to abut the stop so that the drive gear does not absorb any force.

18 Claims, 3 Drawing Sheets

MOTORIZED COLLAPSIBLE STEP

TECHNICAL FIELD

This invention relates in general to movable step assemblies for recreational vehicles and in particular to an apparatus for extending and retracting a movable step assembly.

BACKGROUND ART

The desirability of having steps for recreational vehicles that may be folded out of the way when not in use has long been recognized. Such steps should fold readily, store compactly and permit easy, safe access to the vehicle. One design has incorporated a motor assembly for automatically extending and retracting the step assembly. The motor rotates a pivot rod through a gear assembly which is coupled to the rod. The pivot rod moves a linkage assembly to extend and retract the steps. When the user steps onto the step assembly when it is extended, the forward force created by the weight of the user tends to rotate the rod, which in turn rotates the motor in reverse. The inertia of the gearbox tends to absorb the motion of the assembly which can be detrimental over time. An improved mechanism for extending and retracting collapsible steps is needed.

DISCLOSURE OF THE INVENTION

A collapsible step assembly has upper and lower steps, and a housing which mounts below the door of a vehicle. The steps and housing are interconnected by pivotally mounted linkages. A pivot rod extends transversely through the housing with a linkage fastened to each end. A link arm is connected to the pivot rod with a universal ball joint. A second universal ball joint is used to mount the opposite end of the link arm to a drive gear. The drive gear has teeth which extend circumferentially along an arcuate edge portion. The drive gear is rotationally mounted to the housing and engages a drive gear extending from a motor. The drive gear rotates the pivot rod and, hence, the steps between retracted and extended positions. A flat outer edge of the drive gear abuts a mechanical stop in the extended position. When the user steps on the steps while they are extended, the stop will resist countertorque on the pivot rod from being applied through the gears to the motor. The geometry of the drivetrain causes the pivot point of the link arm to move past a central position to an overcenter position. In the overcenter position, a force on the link arm would tend to cause the drive gear to abut the stop so that the drive gear does not absorb any force.

BEST MODE FOR CARRYING OUT THE INVENTION

Figure 1:
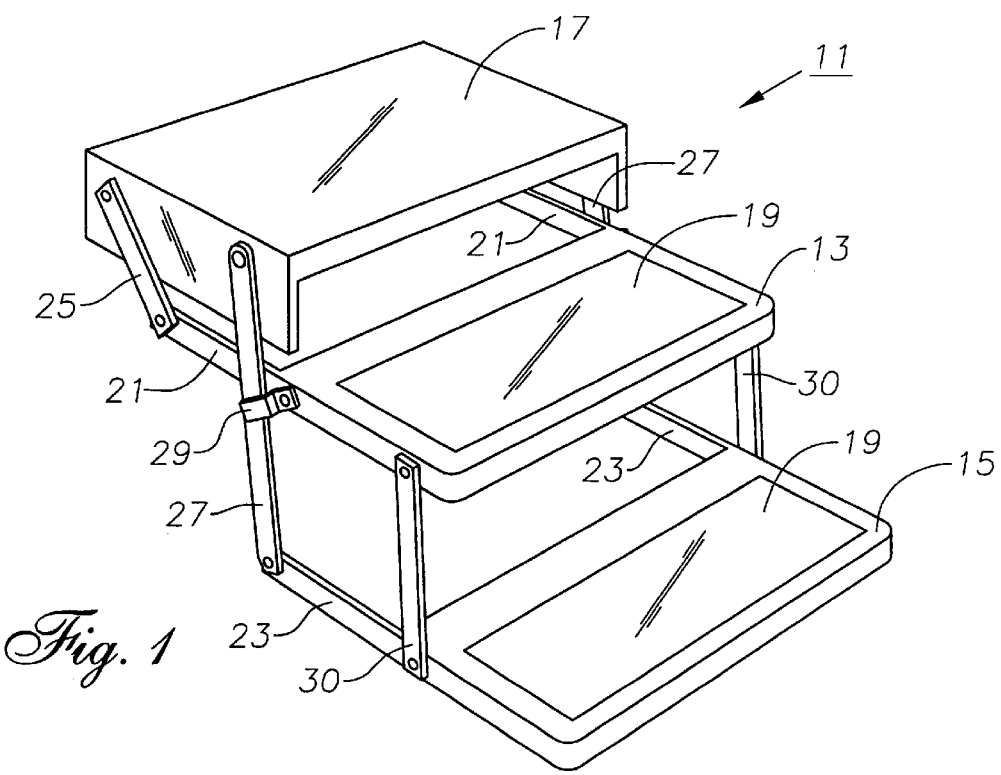
FIG. 1 is an isometric view of a movable step assembly.

Referring to FIG. 1, a collapsible step assembly 11 having a generally rectangular and planar upper step 13, lower step 15 and a frame or housing 17 is shown. Steps 13, 15 and housing 17 remain essentially parallel to one another at all times. Each step 13, 15 is covered with a non-skid material 19 to increase the friction of their respective surfaces. The lengths of steps 13, 15 are approximately one-half of their respective widths. Each step 13, 15 also has arms 21, 23, respectively, extending in a rearward direction from their outer edges. Arms 21, 23 are approximately equal in length to steps 13, 15. Housing 17 is generally box-like in shape and has open front, rear and bottom sides. Housing 17 is provided for mounting assembly 11 to a vehicle (not shown) and for retaining steps 13 and 15 when step assembly 11 is in a retracted position (indicated by the dashed lines in FIG. 2).

Figure 2:
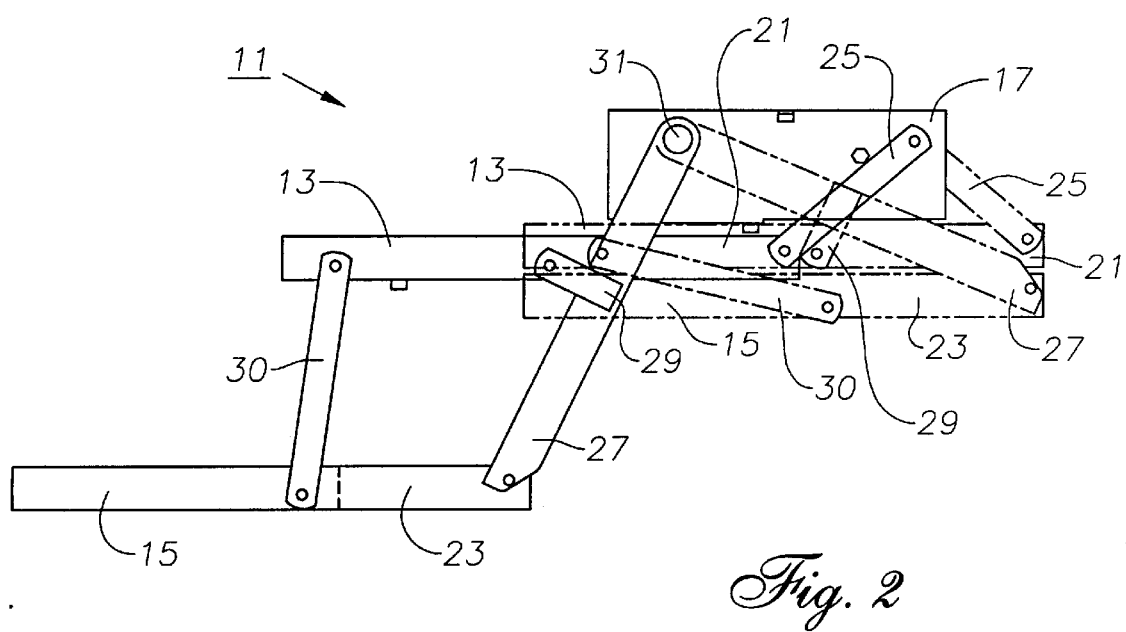
FIG. 2 is a side view of the step assembly of FIG. 1 shown in the extended position and in the retracted position in dashed lines.

As shown in FIGS. 1 and 2, steps 13, 15 and housing 17 are interconnected by eight pivotable linkages, four on each side. The linkages are straight, flat metal strips with holes near their ends and are symmetrically arrayed along each side of assembly 11. Upper step 13 is connected to housing 17 by rearward linkages 25. The upper ends of rearward linkages 25 are pivotally mounted near the upper rearward corners of housing 17. The lower ends of rearward linkages 25 are pivotally mounted near the ends of arms 21. When assembly 11 is in the extended and retracted positions, rearward linkages 25 are skewed downward at approximately 45 degrees forward and rearward, respectively, relative to housing 17.

Lower step 15 is connected to housing 17 by medial linkages 27. Medial linkages 27 are approximately twice as long as and slightly wider than rearward linkages 25. The upper ends of medial linkages 27 are pivotally mounted near the upper forward corners of housing 17. The lower ends of medial linkages 27 are pivotally mounted near the ends of arms 23. In the extended position, medial linkages 27 are skewed forward and downward at approximately 65 degrees relative to housing 17. In the retracted position, medial linkages 27 are skewed rearward and downward at approximately 25 degrees relative to housing 17.

A short brace 29 is welded to and extends perpendicularly forward from each medial linkage 27. The forward end of each brace 29 is pivotally mounted to step 13 near the point where step 13 and arm 21 are joined. When assembly 11 is in the extended position, braces 29 are skewed upward and forward at approximately 25 degrees relative to step 13. When assembly 11 is in the retracted position, braces 29 are skewed downward and forward at approximately 25 degrees relative to step 13.

Lower step 15 is connected to upper step 13 by forward linkages 30. Forward linkages 30 are slightly longer than rearward linkages 25 and shorter than medial linkages 27. The upper ends of forward linkages 30 are pivotally mounted near the forward corners of step 13. The lower ends of forward linkages 30 are pivotally mounted to step 15 near the point where step 15 and arm 23 are joined. In the extended position, forward linkages 30 are skewed downward and slightly forward at approximately 80 degrees relative to step 13. In the retracted position, forward linkages 30 are skewed rearward and downward at approximately 15 degrees relative to step 13.

Figure 3:
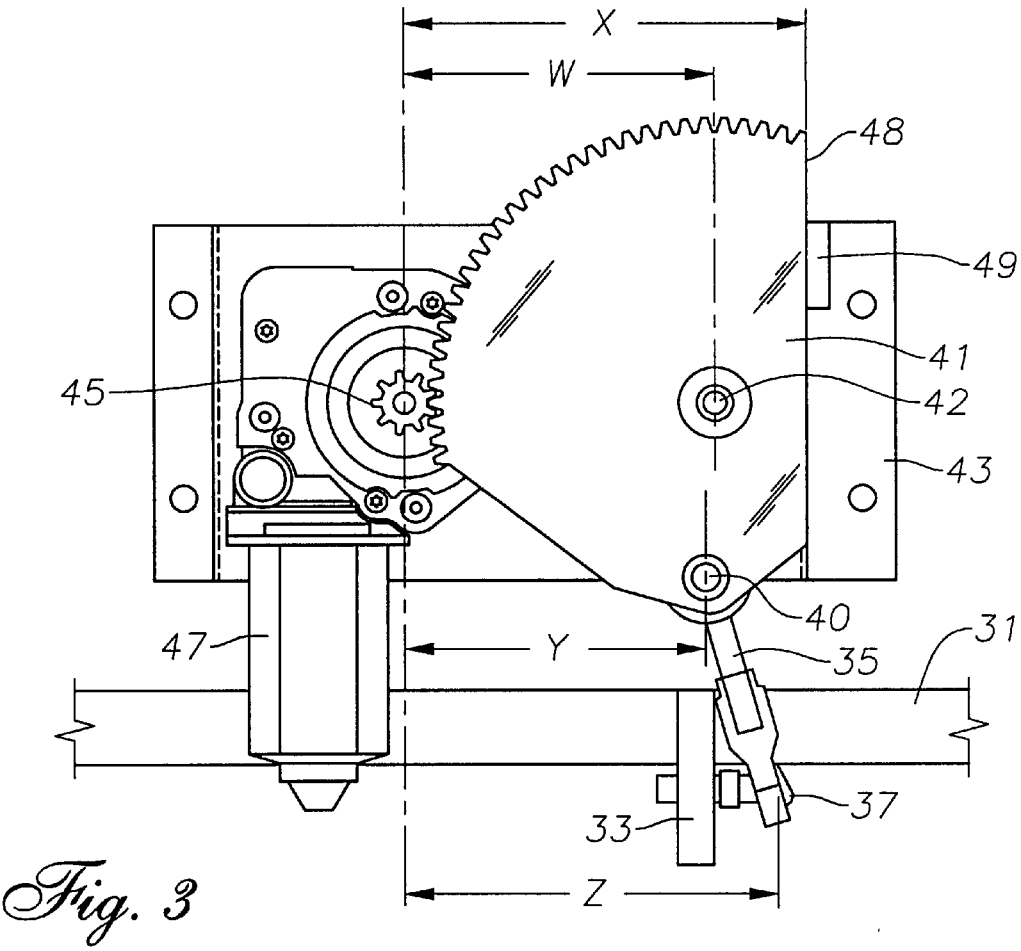
FIG. 3 is bottom view of an apparatus for moving the step assembly of FIG. 1 shown in the extended position and constructed in accordance with the invention.
Figure 4:
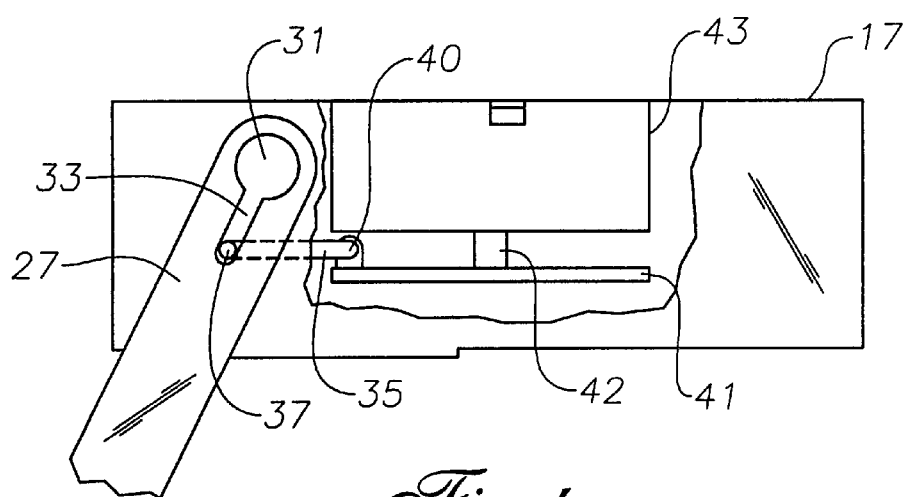
FIG. 4 is a side view of the apparatus of FIG. 1, shown in the extended position.

Referring now to FIGS. 3 and 4, a pivot rod 31 extends transversely through housing 17 with a medial linkage 27 perpendicularly fastened to each end of rod 31. A short finger 33 is rigidly mounted to rod 31. Finger 33 extends radially and perpendicularly away from rod 31. A link arm 35 with a fixed length is connected to finger 33 with a universal ball joint 37. Ball joint 37 allows finger 33 and link arm 35 to move vertically and horizontally relative to one another.

Link arm 35 is swivelly mounted to a horizontal drive gear 41 with a pivot pin 40. Gear 41 has teeth which extend circumferentially along an arcuate edge portion for approximately 119 degrees. Gear 41 is centrally and pivotally mounted with a pivot pin 42 to a motor mounting plate 43 which is mounted to housing 17. The teeth of gear 41 engage a drive gear 45 which extends from a lower side of a motor 47. Gear 45 and pin 42 are separated by a fixed distance "w." Motor 47 is also mounted to motor mounting plate 43. As shown in FIGS. 3 and 4, finger 33 extends forward and downward relative to rod 31, and link arm 35 is horizontally rotated to a forward end of gear 41 when assembly 11 is in the extended position. While in the extended position shown in FIG. 3, link arm 35 is also skewed longitudinally toward motor 47 at an angle of approximately 105 degrees relative to rod 31. In addition, a flat outer edge 48 of gear 41 abuts a mechanical stop 49 in the extended position. Stop 49 is a bar mounted to plate 43 at an angle of approximately 80 degrees relative to rod 31.

Figure 5:
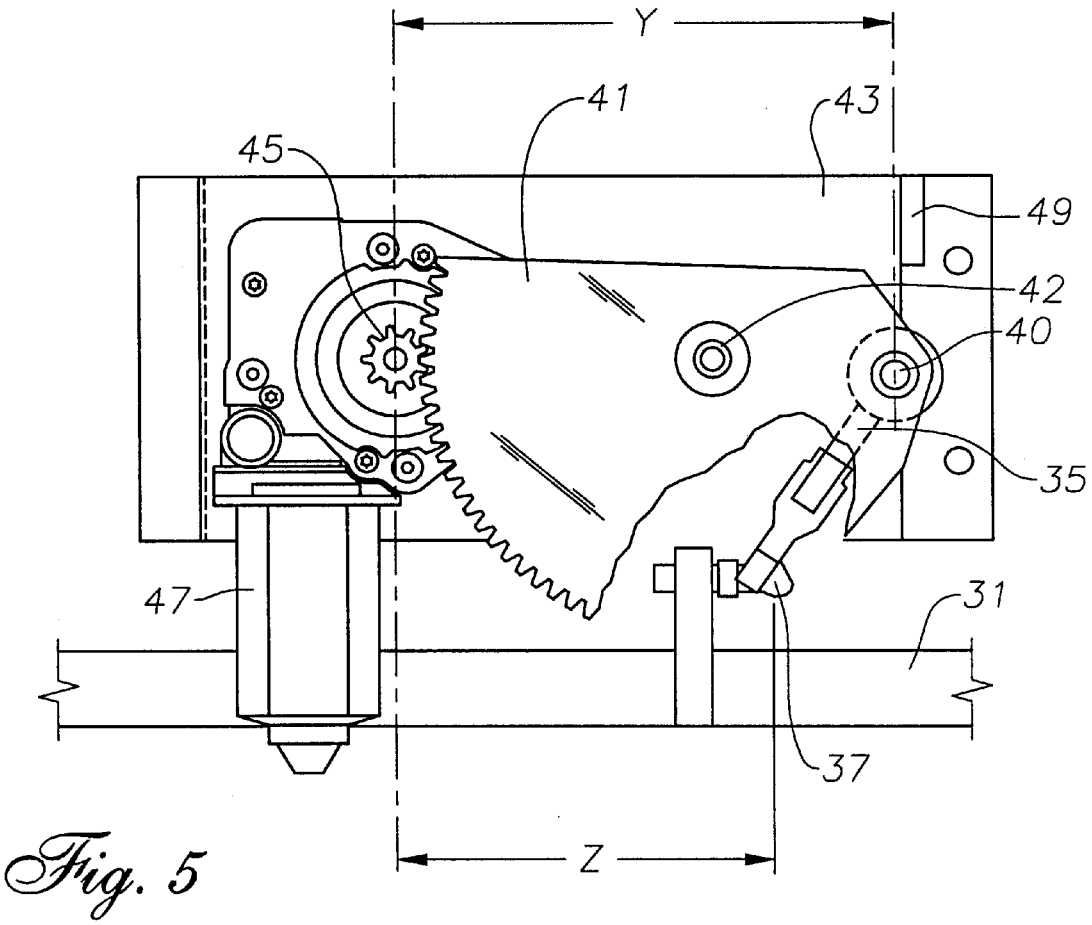
FIG. 5 is a bottom view of the apparatus of FIG. 1, shown in the retracted position.

In the retracted position (FIGS. 5 and 6), finger 33 extends rearward and downward relative to rod 31, and link arm 35 is generally in a common plane with finger 33. Link arm 35 is also skewed longitudinally away from motor 45 at an angle of approximately 50 degrees relative to rod 31. Gear edge 48 is not engaging stop 49 in the retracted position. Motor 47 rotates gear 41 approximately 90 degrees between the extended and retracted positions. Stop 49 is spaced apart from gear 45 by a fixed distance "x" along a line parallel to rod 31. Universal joint 37 is spaced apart from gear 45 by a fixed distance "z" along a line parallel to rod 31. Pivot pin 40 is located at a variable distance "y" from gear 45 along a line parallel to rod 31. In the extended position, distance "y" is less than distance "z" and approximately equal to distance "w." In the retracted position, distance "y" is greater than distance "z." At a center position (not shown) between the extended and retracted positions, pivot points 40, 42 and universal joint 37 will align along a line perpendicular to rod 31. At the center position, distance "y" is slightly less than distance "z."

Figure 6:
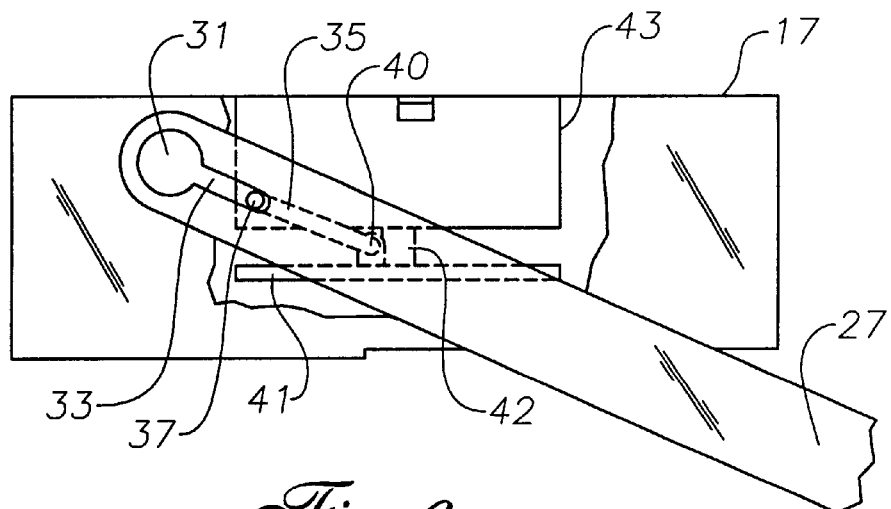
FIG. 6 is a side view of the apparatus of FIG. 1, shown in the retracted position.

In operation, housing 17 of step assembly 11 is mounted to the underside of a vehicle adjacent to the doorway. Prior to use, assembly 11 is in the retracted position (FIGS. 5, 6 and dashed lines in FIG. 2) so that steps 13, 15 are recessed within housing 17. When assembly 11 is actuated to move to the extended position, motor 47 rotates drive gear 45 counterclockwise (when viewed from below) which rotates gear 41 clockwise approximately 90 degrees from the position shown in FIG. 5 to the position shown in FIG. 3. As gear 41 moves between these positions, link arm 35 pushes finger 33 in a direction away from gear 41 so that rod 31 is rotated clockwise (FIGS. 4 and 6). This rotation causes steps 13, 15 to move to the extended position.

Assembly 11 is configured so that when pressure is placed on steps 13, 15 while they are extended, stop 49 will resist countertorque on rod 31 from being applied through gears 41, 45 to motor 47. The geometry of the drivetrain causes pivot point 40 to move past the center position to an overcenter position. Since distance "y" is less than distance "z" while assembly 11 is extended, a force on link arm 35 toward gear 41 due to rod 31 tending to rotate would tend to cause gear edge 48 to rotate in a clockwise direction so that it abuts stop 49. Consequently, the force on link arm 35 rotates gear 41 against stop 49 so that gear 45 does not absorb any force.

The invention has advantages. By utilizing a finger and link arm which extend transversely from the pivot rod and a perpendicular gear drive, the motor is isolated from the forces exerted on the steps. This drive assembly configuration improves the durability and longevity of motors for collapsible step assemblies while reducing servicing requirements.

While the invention has been shown or described in only some of its forms, it should be apparent to those skilled in the art that it is not so limited, but is susceptible to various changes without departing from the scope of the invention. For example, the assembly could comprise one or more than two steps.

I claim:

1. A movable step apparatus, comprising:
   a mounting frame;
   a mechanical stop mounted to the frame;
   a motor mounted to the frame;
   at least one step;
   a pivot rod mounted to the frame and having a longitudinal axis of rotation;
   a plurality of links pivotally connected between the step, the frame and the pivot rod, for moving the step between a retracted position and an extended position;
   a transmission assembly comprising a drive gear rotatable engaged to an output gear of the motor, the drive gear being rotatable about an axis of rotation and having an outer edge portion which abuts the stop when the step is in an extended position;
   the transmission assembly being coupled between the motor and the pivot rod such that rotating the motor in a first direction causes the pivot rod to move the step to the extended position, and rotating the motor in a second direction causes the pivot rod to move the step to the retracted position; wherein
      while the step is in the extended position, the transmission assembly will engage the stop; and wherein
         the transmission assembly has an overcenter position while the step is in the extended position, such that a force applied to the step while it is in the extended position acts through the transmission assembly to the stop.

2. The apparatus of claim 1 wherein the transmission assembly comprises:
   a link arm coupled to the pivot rod at a first pivot point; and
   the drive gear is pivotally connected between the link arm and the motor at a second pivot point for converting rotary motion of the motor into linear motion of the link arm so that the link arm rotates the pivot rod, the drive gear being rotatable about an axis of rotation.

3. The apparatus of claim 2 wherein while in the overcenter position, the second pivot point is closer to an axis of rotation of the motor output gear than the first pivot point along a line which is parallel to the pivot rod.

4. The apparatus of claim 2, further comprising a finger mounted to and extending from the pivot rod, the first pivot point being a coupling between the link arm and the finger.

5. The apparatus of claim 4 wherein the coupling between the finger and the link arm is a universal ball joint.

6. The apparatus of claim 1 wherein the pivot rod has a range of rotation of approximately 90 degrees between the extended and retracted positions.

7. The apparatus of claim 1 wherein the plurality of links comprises:
   a first linkage pivotally mounted to the frame and to a first one of said at least one step;
   a second linkage pivotally mounted to the frame and to a second one of said at least one step; and a third linkage pivotally mounted to the first and second ones of said at least one step.

8. The apparatus of claim 1 wherein the transmission assembly further comprises:
an articulating link arm coupled to the pivot rod at a first pivot point; and
the drive gear being pivotally connected between the link arm and the output gear at a second pivot point for converting rotary motion of the motor into linear motion of the link arm so that the link arm rotates the pivot rod, the drive gear being rotatable about an axis of rotation, and wherein
while in the overcenter position, the second pivot point is closer to the motor output gear axis of rotation than the first pivot point along a line which is parallel to the longitudinal axis of the pivot rod.

9. A movable step apparatus, comprising:
a mounting frame;
a stationary stop mounted to the frame;
a motor mounted to the frame and having an output shaft with an output gear;
at least one step;
a linkage assembly for movably coupling said at least one step to the mounting frame between a retracted position and an extended position;
a pivot rod rotatably mounted to the frame and having a longitudinal axis of rotation, the pivot rod being connected to the linkage assembly such that rotating the pivot rod in one direction moves the step to the extended position, and rotating the pivot rod in a direction opposite to said one direction moves the step to the retracted position;
a drive gear rotatably engaged to the output gear of the motor, the drive gear being rotatable about an axis of rotation and having an outer edge portion which abuts the stop when the step is in the extended position;
a link arm pivotally mounted to the drive gear at a first pivot point which is spaced apart from the axis of rotation of the drive gear, the link arm being connected to the pivot rod at a second pivot point; wherein
rotating the output gear in a first direction rotates the drive gear in a second direction which in turn rotates the pivot rod in said one direction to move the step to the extended position, and while in the extended position, the first pivot point is in an overcenter position, such that a force on the step tends to rotate the pivot rod in said one direction, but tends to rotate the drive gear in the second direction against the stop due to the overcenter position of the first pivot point.

10. The apparatus of claim 9, further comprising a finger rigidly mounted to and extending from the pivot rod; and wherein
the second pivot point comprises a coupling between the link arm and the finger.

11. The apparatus of claim 10 wherein the coupling between the finger and the link arm is a universal ball joint.

12. The apparatus of claim 9 wherein the pivot rod has a range of rotation of approximately 90 degrees between the extended and retracted positions.

13. The apparatus of claim 9 wherein while in the overcenter position, the second pivot point is closer to the axis of rotation of the motor output gear than the first pivot point along a line which is parallel to the longitudinal axis of rotation of the pivot rod.

14. The apparatus of claim 9 wherein the linkage assembly comprises:

a rearward linkage pivotally mounted to the frame and to an upper one of said at least one step;
a medial linkage pivotally mounted to the frame and to a lower one of said at least one step;
a forward linkage pivotally mounted to said upper and lower ones of said at least one step; and
a brace mounted to the medial linkage and pivotally engaging the upper one of said at least one step.

15. The apparatus of claim 9 wherein the stop is spaced apart from the output shaft of the motor by a fixed distance "x" along a line parallel to the longitudinal axis of the pivot rod; and wherein
the second pivot point is spaced apart from the output shaft of the motor by a fixed distance "z" along the line parallel to the pivot rod; and wherein
the first pivot point is located at a variable distance "y" from the output shaft of the motor along the line parallel to the pivot rod; and wherein
in the extended position, distance "y" is less than distance "z," and in the retracted position, distance "y" is greater than distance "z."

16. The apparatus of claim 15 wherein at a center position between the extended and retracted positions, the first pivot point, the second pivot point and the axis of rotation of the drive gear will align with one another.

17. A movable step apparatus, comprising:
a mounting frame;
a stationary, mechanical stop mounted to the frame;
an electric motor mounted to the frame and having an output shaft with an output gear secured thereto;
a plurality of steps;
a linkage assembly for movably coupling the plurality of steps to the mounting frame between a retracted position and an extended position; the linkage assembly comprising:
a rearward linkage pivotally mounted to the frame and to an upper one of said plurality of steps;
a medial linkage pivotally mounted to the frame and to a lower one of said plurality of steps;
a forward linkage pivotally mounted to said upper and lower ones of said plurality of steps; and
a brace mounted to the medial linkage and pivotally engaging the upper one of said plurality of steps; and
wherein the apparatus further comprises:
a pivot rod rotatably mounted to the frame and having a longitudinal axis of rotation which is perpendicular to the output shaft of the motor, the pivot rod being connected to the linkage assembly such that rotating the pivot rod in one direction moves the steps to the extended position, and rotating the rod in a direction opposite to said one direction moves the steps to the retracted position;
a finger rigidly mounted to and extending from the pivot rod;
a drive gear rotatably engaged to the output gear of the motor, the drive gear being rotatable about an axis of rotation and having an outer edge portion which abuts the stop when the steps are in the extended position;
a link arm pivotally mounted to the drive gear at a first pivot point which is spaced apart from the axis of rotation of the drive gear;
a universal ball joint for coupling the link arm to the finger; wherein
rotating the output gear in a first direction rotates the drive gear in a second direction which in turn rotates the pivot rod in said one direction to move the steps to the extended position, and while in the extended position, the first pivot point is in an overcenter position, such that a force on the steps tends to rotate the pivot rod in said one direction, but tends to rotate the drive gear in the second direction against the stop due to the overcenter position of the first pivot point.

18. The apparatus of claim 17 wherein the pivot rod and the drive gear each have a range of rotation of approximately 90 degrees between the extended and retracted positions.

* * * * *